United States Patent [19]
Davis

[11] 3,919,802
[45] Nov. 18, 1975

[54] PROCESS OF MAKING A FISHING LURE AND THE PRODUCT THEREOF

[75] Inventor: Lester M. Davis, Gig Harbor, Wash.

[73] Assignee: Les Davis Fishing Tackle Co., Tacoma, Wash.

[22] Filed: Sept. 12, 1974

[21] Appl. No.: 505,245

[52] U.S. Cl. .............. 43/42.5; 43/42.34; 43/42.53
[51] Int. Cl.² ........................................ A01K 85/00
[58] Field of Search ............... 43/42.34, 42.5, 42.53

[56] References Cited
UNITED STATES PATENTS

| 1,115,743 | 11/1914 | Selig | 43/42.5 |
|---|---|---|---|
| 2,192,563 | 3/1940 | Starkey | 43/42.53 |
| 2,235,000 | 3/1941 | Albers | 43/42.5 |
| 2,503,607 | 4/1950 | Arff | 43/42.34 |

Primary Examiner—Louis G. Mancene
Assistant Examiner—Daniel J. Leach

[57] ABSTRACT

A two-stage pressing operation for making a fishing lure from a sheet of form-retaining, corrosive-resisting, metal, such as spring brass, is disclosed along with the resulting lure. The original blank has a central portion and two semicircular end portions positioned with the circular portions thereof extending away from the central portion. First, the blank is pressed to form flutes extending lengthwise of, and for the full length, of the blank. These flutes, considered crosswise of the blank, are a series of convex suffaces of uniform width forming one surface of the lure blank and a similar series of concave surfaces forming the opposite surface of the lure blank, the latter surface having juncture lines between connecting concave surfaces. Thus, the central and end portions of the lure blank are provided with first concavo-convex surfaces comprising a plurality of side-by-side, parallel concavo-convex surfaces. Next, the end portions of the lure are provided with concavo-convex surfaces, with the arcs thereof extending lengthwise of the lure and at right angles to the first-mentioned plurality of concavo-convex surfaces. These concavo-convex surfaces, on the end portions of the lure blank, face in opposite directions and not only provide the lure with the desired action in the water but tend to cross brace the lure and make the same more rigid. Also, the latter concavo-convex surfaces can be added sequentially and the same will not substantially diminish the curvature of the first-mentioned concavo-convex plurality of surfaces.

10 Claims, 11 Drawing Figures

PROCESS OF MAKING A FISHING LURE AND THE PRODUCT THEREOF

BACKGROUND OF THE INVENTION

Heretofore fluted fishing lures, such as that exemplified by U.S. Pat. No. 2,503,607, have been made and demonstrated the need to provide fluted flat lures with a plurality of longitudinally extending flutes to provide for light reflection in a plurality of parallel patterns from the lure rather than from a single pattern from such lure. However, such lures did not have the desired action in the water due to the end configurations of such lures. Also, such lures did not have the desired crosswise stiffness when made from conventional materials and of conventional thickness and weight. I overcome the shortcomings of the prior art by sequentially forming the lure by a first pressing of longitudinally extending flutes in the lure blank which have crosswise extending concavo-convex shapes. At the same time, I stress the lure crosswise to an overall concavo-convex configuration so that the lure blank will have a tendency to assume a flat contour after release from such first pressing operation. Then, I subsequently provide a second pressing of the lure blank and provide oppositely facing concavo-convex shaped end portions wherein the arc shapes are longitudinally of the lure blank as distinguished from crosswise thereof.

SUMMARY OF THE INVENTION

A fishing lure formed from a sheet of spring brass has many advantages. I have found that the greatest advantages obtain where the shape of the lure blank formed from such material is provided with a rectangular shaped central portion and semicircular end portions integral with the central portion and with the circular portions extending away from the central portion.

Next, such a lure blank is pressed and provided with the desired surface contours by a press having a punch and die. The punch of such a press has a series of side-by-side, preferably uniform, longitudinally extending ridges, the surface of which in cross section is a plurality of convex shapes. The die of such a press has a series of side-by-side longitudinally extending, valleys (mating with the ridges in the punch), which in cross section is a plurality of concave shapes. Such plurality of convex and concave surfaces in the punch and die of the first press provide in the lure blank, pressed thereby, one surface which comprises a plurality of side-by-side, longitudinally extending ridges and which in section are a series of convex convolutions and an opposite surface which comprises a plurality of side-by-side, longitudinally extending valleys and which in section are a series of concave convolutions.

The punch and die of the same press are provided with overall, mating curvatures, crosswise considered, and with the punch convex and the die concave. The amount of curvature is sufficient to take care of the amount of spring back in the metal caused by the pressing of the before-mentioned series of concavo-convex shapes.

Next, a second press is employed to additionally press the lure blank previously provided with the said series of concavo-convex shapes. The additional pressing provides concavo-convex shaped end portions to the lure and the arc shapes thereof are longitudinal of the lure and at right angles to the previously mentioned series of concavo-convex configuration. Also, these concavo-convex shaped end portions face in opposite directions.

Other features of my invention will become explicit or implicit as the description of my invention proceeds in connection with the drawings, wherein like reference numerals refer to like parts and wherein:

THE DRAWINGS

Figure 1:
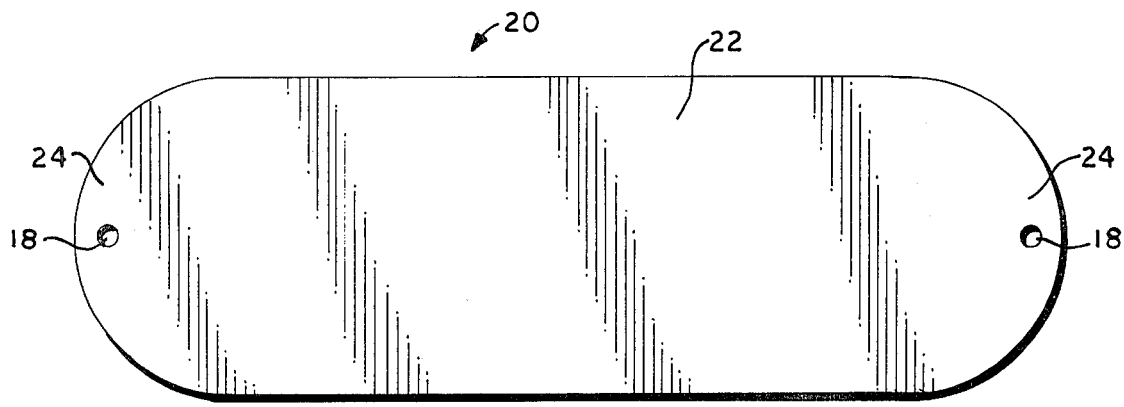
FIG. 1 is a plan view of a blank employed in fabricating the lure of my invention.
Figure 2:
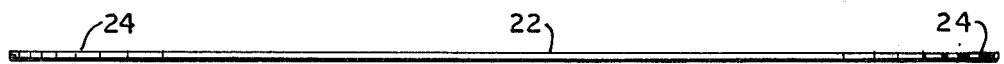
FIG. 2 is an elevational view of the structure shown in FIG. 1.
Figure 3:
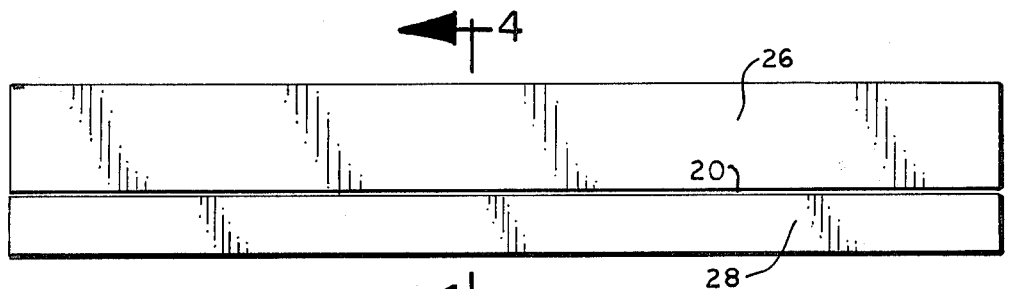
FIG. 3 is a view in side elevation of a punch and die of a press used for pressing the blank of FIG. 1.
Figure 4:
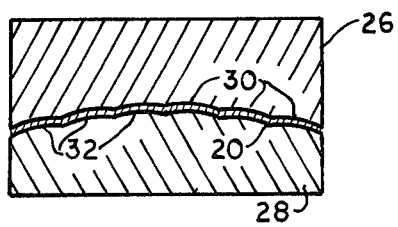
FIG. 4 is a sectional view taken substantially on broken line 4—4 of FIG. 3.
Figure 5:
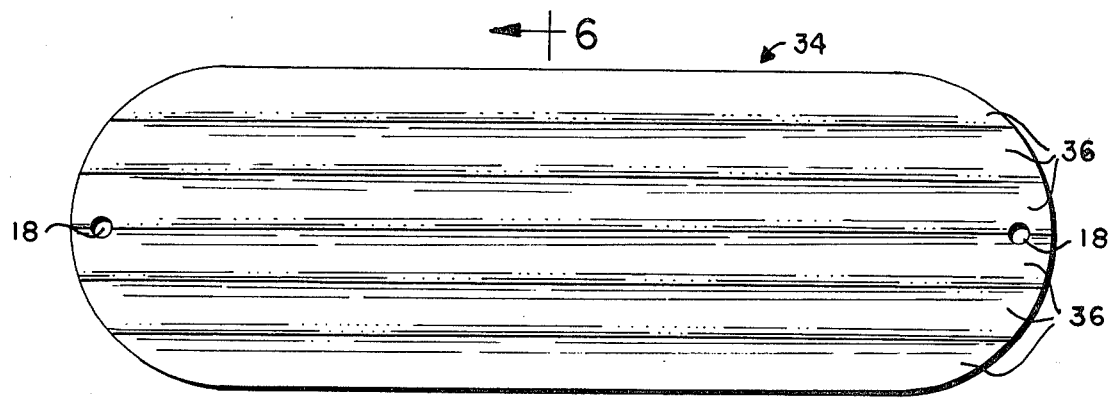
Figure 6:
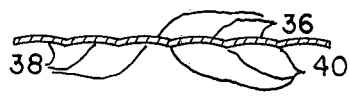
Figure 7:
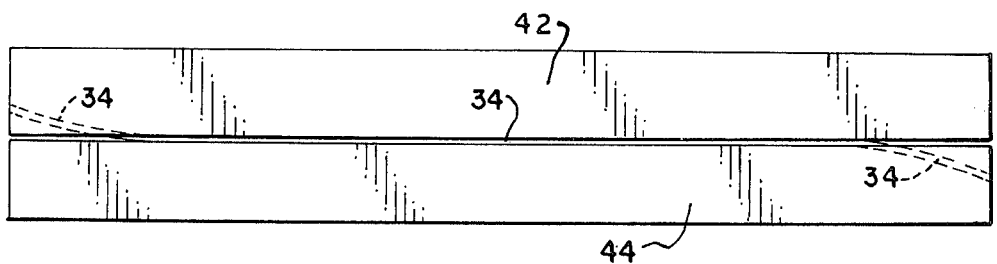
Figure 8:
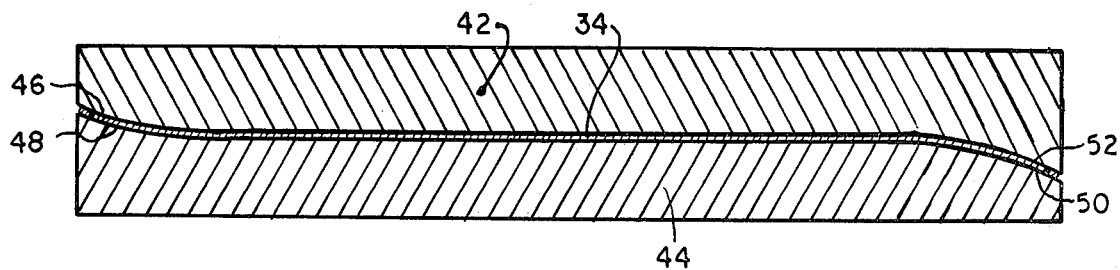
Figure 9:
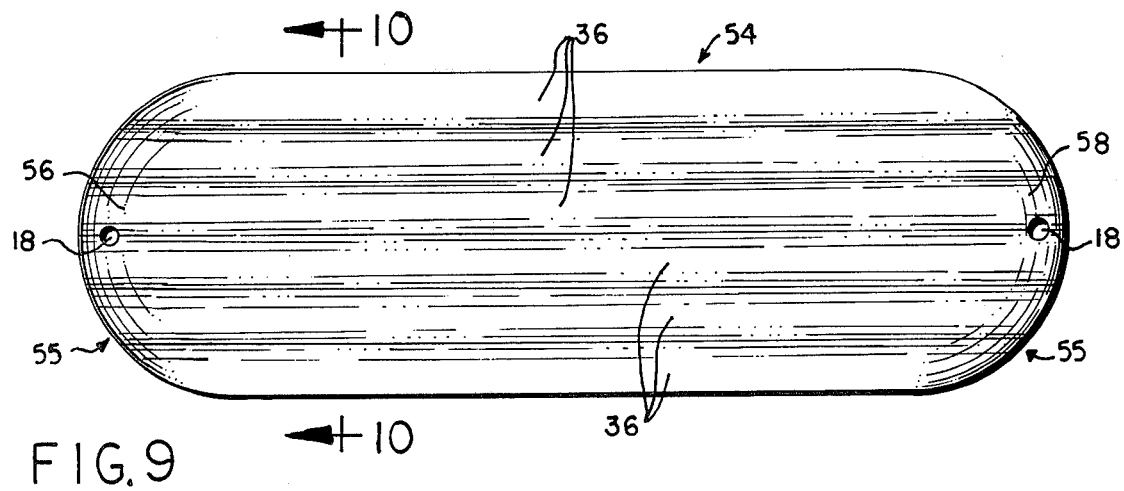
Figure 10:
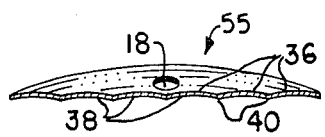
Figure 11:
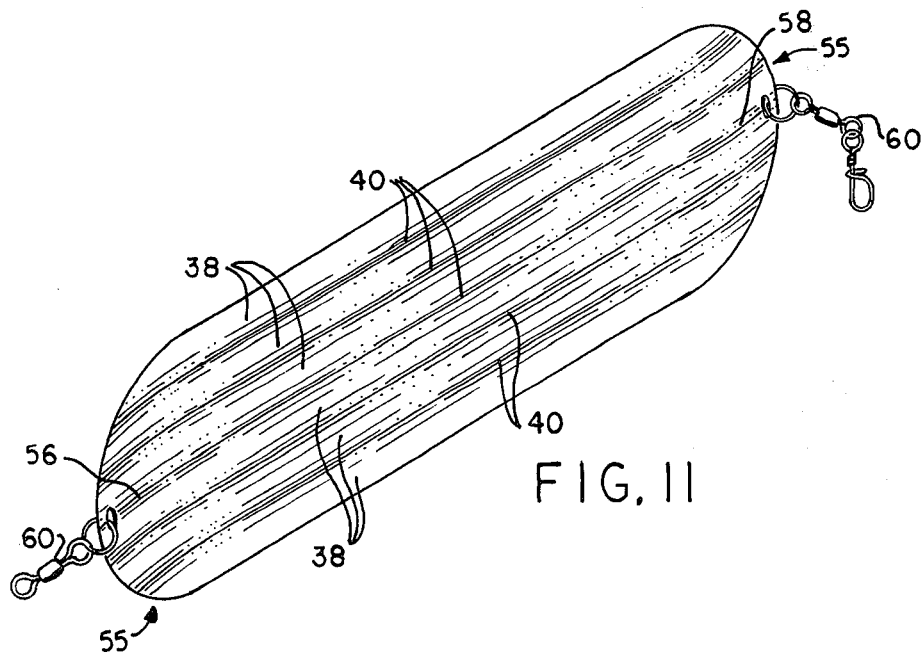

FIG. 5 is a plan view of the fluted blank fabricated by the pressing of the blank of FIGS. 1 and 2 in a press employing the punch and die of FIGS. 3 and 4; and FIG. 6 is a sectional view taken substantially on broken line 6—6 of FIG. 5;

FIG. 7 is a view in side elevation of a punch and die of a press employed in pressing the partially completed lure shown in FIGS. 5 and 6 of the drawings;

FIG. 8 is a longitudinal section of the structure shown in FIG. 7;

FIG. 9 is a plan view of the completed lure;

FIG. 10 is a sectional view taken substantially on broken line 10—10 of FIG. 9 (parts being shown in elevation); and FIG. 11 is a perspective view of the lure of FIGS. 9 and 10.

DESCRIPTION

In FIGS. 1 and 2 of the drawings, the metal blank 20, having openings 18 at the end portions thereof, is fabricated, preferably, of spring brass and of seven numbers hard, a metal commonly employed in the fabrication of fishing lures. This metal has appropriate erosion-resistant and form-retaining qualities for use in salt- and fresh-water fishing. Blanks 20 will be made from various sizes in plan, and of different thicknesses, as is now conventional, to satisfy different fishing needs and different desires of fishermen. The sheet blanks 20 include a rectangular central portion 22, provided with semicircular, integral end portions 24 disposed with the circular portions thereof extending away from the central portion 22.

The metal blank is placed in a fluting press between the die 26 and mating punch 28 thereof, which die and punch are illustrated somewhat diagrammatically in FIGS. 3 and 4 of the drawings. The punch 28 and die 26 are mounted to move under pressure toward each other and with the appropriate pressure to deform the blanks 20 and form the flutes therein. As pressure presses of this sort are well known in the art, only the die and punch parts thereof are illustrated in the drawings and described herein. The die part 26 is provided with a surface comprising a plurality of longitudinally extending, parallel channels disposed in side-by-side relation and each thereof, in a crosswise direction, has a concave configuration. The punch part is provided with a surface comprising a plurality of longitudinally extending, parallel ridges disposed in side-by-side relation, and each thereof in a crosswise direction has a convex configuration. The patterns on the punch and die mate with each other.

Also, for forming such flutes in a spring brass metal blank of seven numbers hard, and where the blank is approximately 2 inches wide and six flutes are to be formed, there should be a bending allowance or an arc or overall concave-convex relation between the punch and the die. Thus, the central portion of the concavity, as respects the showing in FIG. 4 of the drawings, may have an elevation of approximately 3/16 inch over the elevation of the side portions of such concave die. With this extra overall curvature of the die 26 and mating punch 28, the lure blank, after being pressed as indicated in connection with FIGS. 3 and 4, will spring back and the surface of the lure having the convex portions thereof will have the crests lie in a common plane and the other surface of the lure having the juncture lines between concave sections will have such juncture lines lying in a common plane. The amount of curvature to be allowed for spring back will depend upon the width of the lure blank, the metal employed, and the temper of such metal.

After the blank 20 of FIGS. 1 and 2 has been pressed by punch 28 and die 26 of FIGS. 3 and 4 and the blank 20 is at rest after having been released from between the punch 28 and the die 26, the resultant lure blank 34 of FIGS. 5 and 6 is produced. This lure blank 34 is provided with a plurality of longitudinally extending hills and valleys on the opposite surfaces thereof and in cross section convex-concavo surfaces, wherein the convex surfaces are numbered 36 and the concave surfaces are numbered 38. The junctures or longitudinal lines between concave surfaces are numbered 40. In view of the fact that the amount of extra curvature in the punch 28 and die 26 was allowed to take care of the spring back of the metal employed, now the lure blank 34 lies flat (with the exception, of course, of the concavo-convex configuration by reason of the convex and concave portions 38 and 36) and the lines 40 lie in a common crosswise plane and the crests of the convex portions 36 are tangent to a common crosswise plane. When the lure of my invention is fabricated from form-retaining metal, preferably spring brass, then it is essential that the press operation described in connection with FIGS. 3 and 4 to provide the longitudinally extending flutes be first made to provide the fluted lure blank 34 before further pressing of the lure is undertaken. If it is attempted to provide all of the pressing, including that described in connection with FIGS. 3 to 6 and that to be described in connection with FIGS. 7 and 8, then an undesirable lure is provided if all the pressing is done at one time. In other words, a necessary sequence operation is involved and the pressing described in connection with FIGS. 3 to 6 must be first accomplished and then thereafter followed by the pressing which will be described in connection with FIGS. 7 and 8.

Now referring to FIGS. 7 and 8, two mated die members 42 and 44 have longitudinally extending, matching, convex and concave portions 46 and 48 at the forward end of the dies and longitudinally extending and matching convex and concave portions 50 and 52 on the trailing end portion of said dies. It is preferable that the curvature of the portions 50 and 52 be increased over that of portions 46 and 48. The dies 42 and 44, through the mid portion or the central portion thereof, are provided with matching flat surfaces. Pressing the lure blank of FIG. 6 in the press of FIGS. 7 and 8 need not substantially alter the concavo-convex surfaces (concave and convex surfaces 36, 38) previously provided as the arcs of said surfaces 36, 38 are sharp and well formed and resist deformation. Thus, the longitudinally extending concavo-convex portions (facing in opposite directions) can be added to the lure blank 34 by operation of the die parts described in connection with FIGS. 6 and 7 of the drawings without substantially disturbing the well defined concavo-convex portions 36 and 38 previously placed in the lure blank 34 by reason of the operation of the punch and die parts described in connection with FIGS. 3 and 4 of the drawings.

The resultant lure produced by the sequential pressing just described in connection with FIGS. 3 and 4 and followed by the pressing of FIGS. 6 and 7, produces the lure shown in FIGS. 9 to 11, inclusive. Here, we have a fishing lure comprising a central portion 54 which is substantially a rectangle. This central portion is provided with longitudinally extending crests and valleys providing the crosswise concavo-convex surfaces 36, 38 and the longitudinally extending juncture lines 40. These concavo-convex surfaces 38, 36 are preferably all of the same width and preferably all of the juncture lines 40 extend parallel to each other. The semicircular end portions 55 have their circular portions extending away from the central portions 54 and are provided with concavo-convex portions 56 and 58, which extend in a lengthwise direction of the lure and at right angles to the curvature of concavo-convex portions 38, 36. The concavo-convex end portions 56, 58 have one thereof facing in one direction and the other thereof facing in the opposite direction. Also, the semicircular end portions 55 are integral with the central portion 54 and the concavo-convex portions 38, 36 in the central portion extend and continue throughout the length of the concavo-convex end portions 56 and 58. The additional concavo-convex end portions 56, 58 formed by a second pressing operation does not interfere with the previously formed concavo-convex portions 38, 36, but, in fact, the concavo-convex end portions 56, 58 function as a bracing and further tend to stiffen and maintain the shape of the lure. In addition, the said end portions 56, 58, which face in opposite directions, augment the erratic, darting and flashing characteristics of the final completed lure.

If a lure is made from a softer metal than spring brass, then the lure will not have all of the advantages of the preferred form of my invention but all of the pressing of such a lure can be done in a single stage rather than by a sequence of pressings. Also, if the lure is to be molded from a plastic, all advantages again of my prefered form of lure will not be present but such a lure can be molded from a single mold press operation.

SUMMARY

In general, I have provided a fishing lure formed of sheet stock which is preferably spring brass and has a central portion 54 which is rectangular in shape and semicircular end portions 55 which are integral with the central portion 54 and which have the circular portions of the end portion 55 extending away from the central portion 54. Next, I provide flutes which are crests on one side and valleys on the other side and which flutes extend longitudinally of the central portion 54 and the semicircular end portions 55. These flutes are, crosswise of the lure, concave portions 38 and convex portions 36 forming concavo-convex surface portions cross sectionally of the lure. When the lure is made from a form-retaining material, such as spring brass, then the longitudinally extending flutes are first pressed into the metal by a single operation of a pair of mating punch and die members. Also, the said mating punch and die members are provided with an overall curvature so that there will be an overall curvature of the lure blank, crosswise considered so that upon spring back of the metal caused by the punching of the concavo-convex configuration, the metal will resume a rest position of being overall flat or, in other words, the juncture line between the concave surfaces will lie in a common plane and the crests of the convex portions will abut a common plane.

After the formation of the lure blank with such longitudinally extending flutes, then and preferably by a sequential second pressing operation, concavo-convex configurations are formed on the end portions of the lure blank and with such concavo-convex configurations facing in opposite directions and with the curvatures of the concavo-convex configurations at the end portions extending longitudinally of the lure and at right angles to the plurality of concavo-convex surfaces which are parallel to each other and which were first formed in both the central and end portions of the lure. Two line engaging means 60 are provided on the end portions of the lure and engage with the openings 18 in the lure body and which lure engaging means are numbered 60, one of which connects with the fishing line and the other of which connects with a second lure including the hook, and the like.

Obviously, changes can be made in the forms, dimensions, and arrangements of the parts of my invention without departing from the principle thereof, the above setting forth only preferred forms of embodiment of my invention.

I claim:

1. A fishing lure comprising a substantially rectangular sheet, a central portion provided with longitudinally extending flutes therein; and semicircular end portions, integral with said central portion, disposed with the circular portions thereof extending away from said central portion, having flutes therein which are extensions of the flutes in the central portion, and formed into oppositely facing concavo-convex configurations.

2. The combination of claim 1, wherein said central and end portions are formed of spring brass.

3. The combination of claim 2, wherein said flutes in said central and end portions are formed and thereafter the concavo-convex configurations of the end portions are formed from such fluted material.

4. The combination of claim 1, wherein said flutes are parallel to each other.

5. The combination of claim 1, wherein said flutes comprise a plurality of joined sections, each thereof being concavo-convex and with the concave surfaces forming one surface of the lure and the convex portions forming the opposite surface thereof.

6. The combination of claim 1, wherein fishing line engaging means is disposed at one end portion of said lure and second lure engaging means is disposed at the other end portion thereof.

7. The process of making a fishing lure comprising providing a substantially rectangular, central portion, metallic sheet and integral semicircular, meltallic sheet, end portions and with the end portions disposed with the circular portions thereof extending away from the central portion; providing longitudinally extending, continuous flutes in said central and end portions; and forming said fluted end portions into oppositely facing concavo-convex configurations.

8. The combination of claim 7, wherein said flutes in said central and end portions are formed of equal width and parallel to each other.

9. The combination of claim 7, wherein said longitudinally extending flutes are formed from a plurality of joined sections, each thereof being concavo-convex and with the concave surfaces forming one surface of the lure and the convex portions forming the opposite surface.

10. The combination of claim 7, wherein fishing line engaging means is provided at one end portion of the lure and second lure engaging means is provided at the other end portion thereof.

* * * * *